US008186649B2

(12) United States Patent
Aoki

(10) Patent No.: US 8,186,649 B2
(45) Date of Patent: May 29, 2012

(54) FEMALE COUPLING MEMBER AND MALE COUPLING MEMBER

(75) Inventor: Kazunori Aoki, Tokyo (JP)

(73) Assignee: Nitto Kohki Co., Ltd., Tokyo (JP)

( * ) Notice: Subject to any disclaimer, the term of this patent is extended or adjusted under 35 U.S.C. 154(b) by 65 days.

(21) Appl. No.: 12/914,227

(22) Filed: Oct. 28, 2010

(65) Prior Publication Data

US 2011/0037254 A1     Feb. 17, 2011

Related U.S. Application Data

(63) Continuation of application No. PCT/JP2009/058496, filed on Apr. 30, 2009.

(30) Foreign Application Priority Data

Apr. 30, 2008   (JP) ................................ 2008-119100

(51) Int. Cl.
*F16L 37/28* (2006.01)
(52) U.S. Cl. .................. 251/149.6; 251/149.1
(58) Field of Classification Search .................. 251/149, 251/149.1, 149.6, 149.8, 149.9, 148, 151, 251/89.5; 137/614.06
See application file for complete search history.

(56) References Cited

U.S. PATENT DOCUMENTS

| | | | | |
|---|---|---|---|---|
| 3,052,261 A | * | 9/1962 | Nyberg | 137/614.05 |
| 3,131,905 A | * | 5/1964 | Nyberg | 251/149.6 |
| 3,731,705 A | * | 5/1973 | Butler | 137/614.06 |
| 4,118,006 A | * | 10/1978 | Norton et al. | 251/149.6 |
| 5,607,139 A | * | 3/1997 | Kjellberg | 251/149.6 |
| 6,035,894 A | | 3/2000 | Weh et al. | |

(Continued)

FOREIGN PATENT DOCUMENTS

JP   2000-515953 A   11/2000

(Continued)

OTHER PUBLICATIONS

International Search Report for International Application No. PCT/JP2009/058496, dated Jul. 21, 2009, 1 page.

*Primary Examiner* — John Fristoe, Jr.
*Assistant Examiner* — Andrew J Rost
(74) *Attorney, Agent, or Firm* — Brinks Hofer Gilson & Lione

(57) ABSTRACT

A pipe coupling capable of being safely connected and disconnected. The pipe coupling has a tubular housing (16), a first locking member (18), a pressing member (24), a valve member (30), and a second locking member (50) provided between the valve member (30) and the pressing member (24). When the housing is communicated with a fluid source with the pressing member (24) placed in a standby position (FIGS. 1 to 4), the second locking member is displaced by the valve member, which is displaced toward an open position by fluid pressure. In this process, the second locking member engages with the pressing member (24) before the valve member reaches the open position (FIG. 2), thereby preventing the valve member from reaching the open position and, at the same time, preventing the pressing member from being displaced to a pressing position. When the housing is communicated with the fluid source with the pressing member (24) placed in the pressing position (FIG. 4), the second locking member does not engage with the pressing member and allows the valve member to be displaced to the open position.

12 Claims, 5 Drawing Sheets

U.S. PATENT DOCUMENTS

| | | | |
|---|---|---|---|
| 6,279,874 B1 * | 8/2001 | Nyberg | 251/149.6 |
| 6,283,443 B1 * | 9/2001 | Taneya | 251/149.6 |
| 6,779,777 B2 * | 8/2004 | Kouda | 251/149.6 |
| 6,886,804 B2 * | 5/2005 | Doi et al. | 251/149.6 |
| 7,497,231 B2 * | 3/2009 | Sasa | 137/614.06 |

FOREIGN PATENT DOCUMENTS

| | | |
|---|---|---|
| JP | 2006-105285 A | 4/2006 |
| WO | WO 98/04866 A1 | 2/1998 |

\* cited by examiner

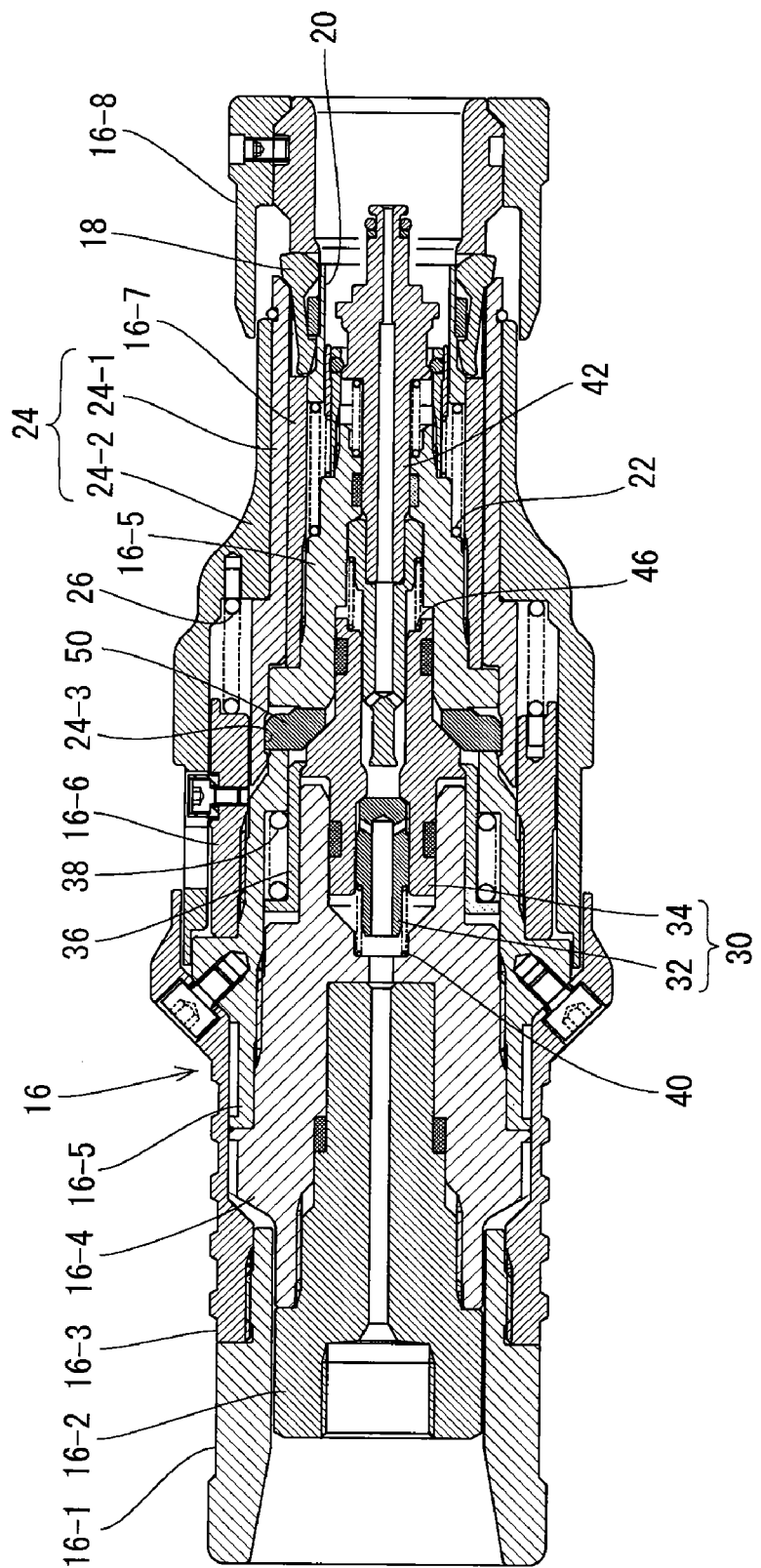
[Fig. 1]

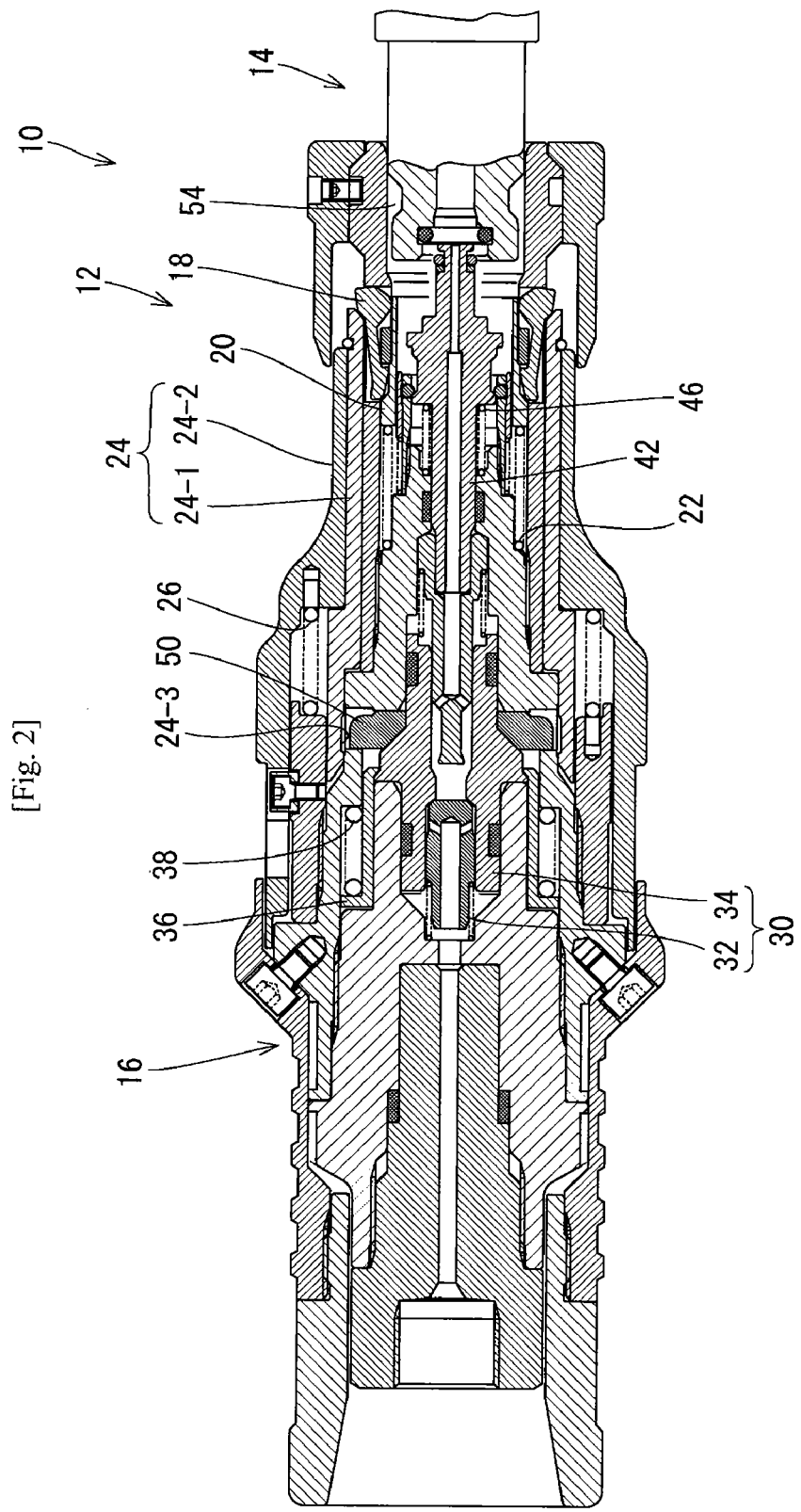
[Fig. 2]

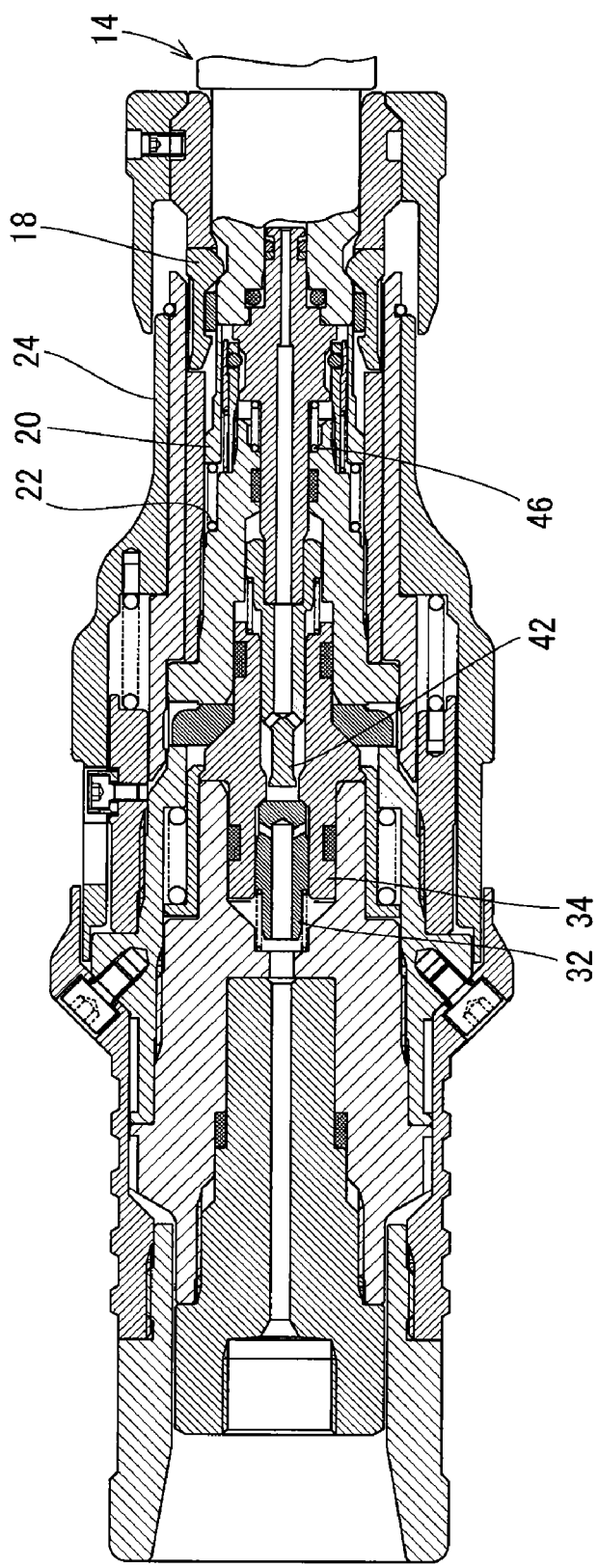
[Fig. 3]

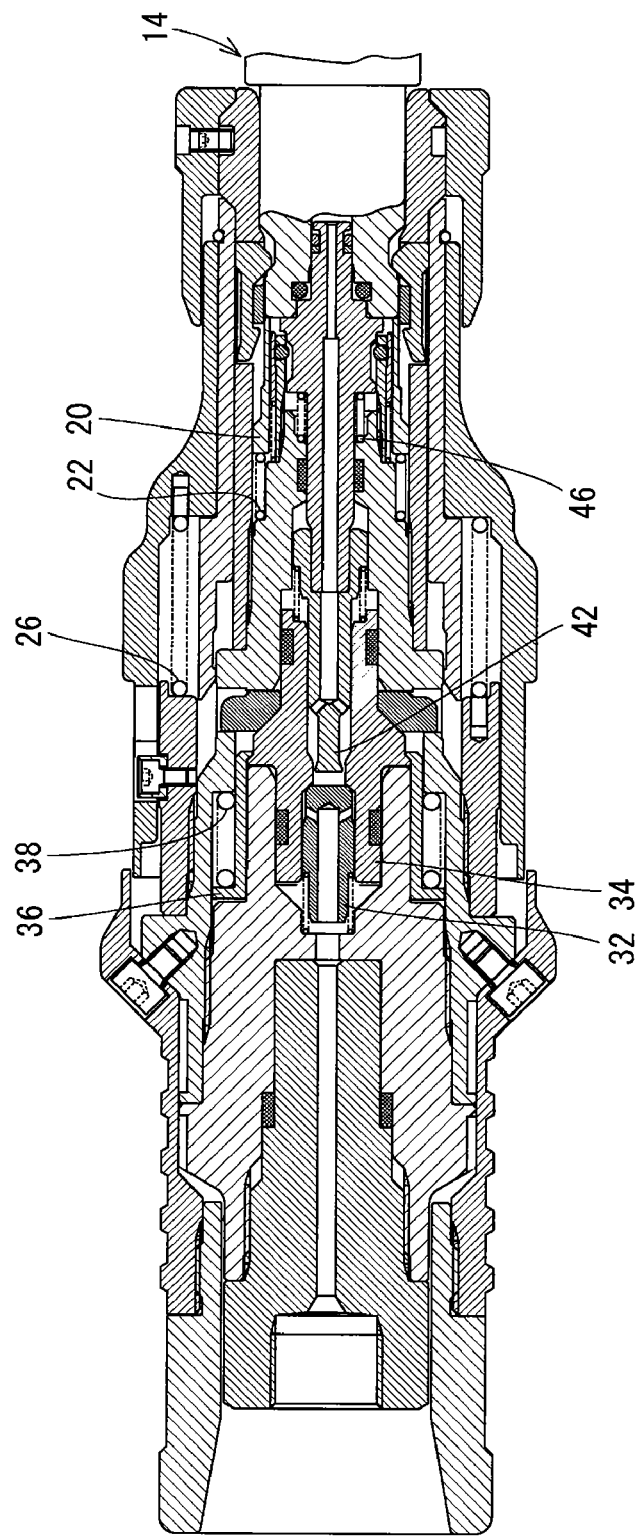
[Fig. 4]

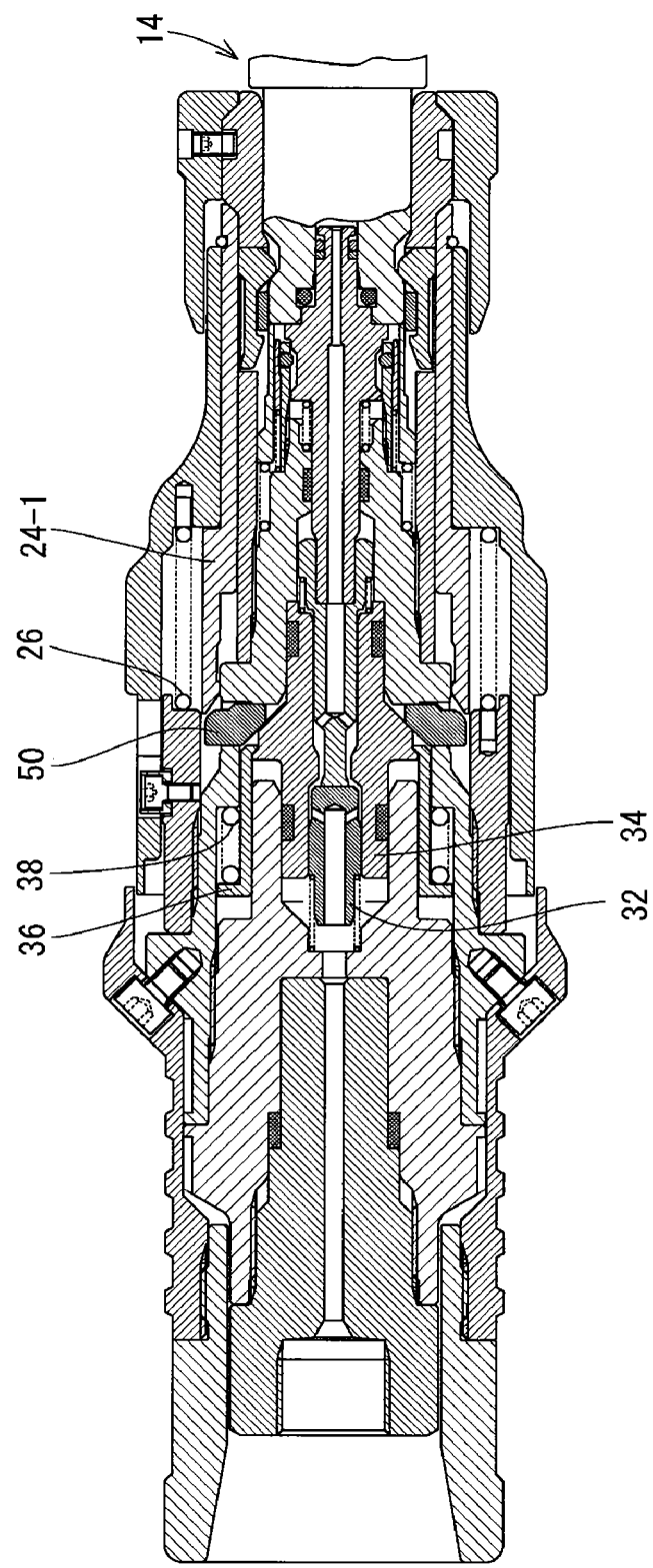
[Fig. 5]

FEMALE COUPLING MEMBER AND MALE COUPLING MEMBER

RELATED APPLICATIONS

This application is a continuation of PCT/JP2009/058496 filed on Apr. 30, 2009, which claims priority to Japanese Application No. 2008-119100 filed on Apr. 30, 2008. The entire contents of these applications are incorporated herein by reference.

BACKGROUND OF THE INVENTION

1. Field of the Invention

The present invention relates to pipe coupling members suitable for handling high-pressure fluids such as gaseous hydrogen. More particularly, the present invention relates to a female coupling member and a male coupling member.

2. Description of the Related Art

Recently, fuel cell vehicles equipped with a fuel cell using gaseous hydrogen as a power source have been put to practical use. Such fuel cell vehicles need to be supplied with gaseous hydrogen at a gaseous hydrogen supply station similar to a filling station for gasoline engine vehicles, which are the mainstream at present. In this case, a female pipe coupling member attached to an outlet of a hose for supplying gaseous hydrogen discharged from a gaseous hydrogen storage tank at the station is connected to a male pipe coupling member attached to an inlet of a gaseous hydrogen storage tank on the vehicle to supply gaseous hydrogen to the vehicle.

The gaseous hydrogen in this case has usually been pressurized to about 70 MPa. Therefore, it is necessary to take all possible measures to avoid occurrence of accident when the male and female pipe coupling members are connected together. For example, it is necessary that the supply of gaseous hydrogen should be started after the male and female pipe coupling members have been connected together completely, and it is necessary to prevent the pipe coupling members from being accidentally disconnected from each other after the supply of gaseous hydrogen has been started. In addition, it is necessary to make certain that there is no gaseous hydrogen pressure in the pipe coupling members when they are to be connected and disconnected.

However, there have not been developed pipe couplings meeting the above-described demands.

Patent Literature 1 discloses a pipe coupling suitable for high-pressure fluids. Patent Literature 1: Japanese Patent No. 3894578.

The pipe coupling of Patent Literature 1, however, cannot sufficiently satisfy the above-described demands that need to be met in order to safely handle high-pressure fluids such as gaseous hydrogen. For example, even during the supply of fluid, if an on-off valve-actuating lever of the pipe coupling is pivoted, a sleeve returns, which allows the pipe coupling to be disconnected. Further, in Patent Literature 1, the valve-actuating lever needs to be pivoted after the male member has been inserted into the female member, although the title of the invention is "Rapid Coupling"; therefore, more time and effort are needed for the connecting operation than in the case of pipe couplings in which connection of the male and female members is completed simply by inserting the male member into the female member.

SUMMARY OF THE INVENTION

The present invention has been made in view of the above-described circumstances, and an object of the present invention is to provide a high-pressure fluid pipe coupling that can safely handle a high-pressure fluid and that can be connected even more rapidly, and particularly to provide a female coupling member for use in such a pipe coupling.

The present invention provides a female coupling member including a tubular housing (16) having one end for receiving a male coupling member (denoted by reference numeral 14 in the following description of an embodiment) and the other end to be communicated with a fluid source, a first locking member (18) attached to the housing and displaceable between a locking position (FIGS. 4 and 5) where the first locking member engages with the male coupling member inserted into the housing from the one end of the housing to connect the male coupling member to the housing and an unlocking position (FIGS. 1 and 2) where the first locking member disengages from the male coupling member to disconnect the male coupling member from the housing, a holding member (20) displaceable between a holding position (FIGS. 1 and 2) where the holding member holds the first locking member in the unlocking position and a displacement allowing position (FIGS. 3 to 5) where the holding member is displaced by the male coupling member inserted into the housing to allow the first locking member (18) to be displaced to the locking position, and a pressing member (24) attached to the housing and displaceable between a standby position (FIGS. 1 and 2) where the pressing member allows the first locking member to assume the unlocking position and a pressing position (FIGS. 4 and 5) where the pressing member presses the locking member in the locking position in response to the holding member being displaced to the displacement allowing position. The female coupling member further includes a valve member (30) displaceable between an open position (FIG. 5) where the valve member opens a fluid passage in the housing that is communicated with the male coupling member inserted into the housing and a closing position (FIGS. 1 to 4) where the valve member closes the fluid passage. The valve member is displaced to the open position by fluid pressure in the fluid passage in the housing. Further, the female coupling member includes a second locking member (50) provided between the valve member (30) and the pressing member (24) and displaceable between a first position and a second position. When the housing is communicated with the fluid source with the pressing member (24) placed in the standby position (FIGS. 1 and 2), the second locking member (50) is displaced from the first position toward the second position by the valve member displaced toward the open position by the fluid pressure but prevented from reaching the second position by engaging with the pressing member before the valve member reaches the open position, thereby preventing the valve member from reaching the open position and also preventing the pressing member from being displaced to the pressing position. When the housing is communicated with the fluid source with the pressing member (24) placed in the pressing position (FIG. 4), the second locking member is displaced from the first position to the second position without engaging with the pressing member, thereby allowing the valve member to be displaced to the open position.

In this female coupling member, if it has been communicated with the fluid source before the male coupling member is connected thereto, the second locking member (50) is arrested by the pressing member (24), thereby preventing the valve member from being displaced to the open position and also preventing the pressing member from moving from the standby position to the pressing position. Accordingly, connection between the male coupling member and the female coupling member cannot be made. That is, in this female coupling member, connection of the male coupling member can be made only when the female coupling member is not fluid-communicated with the fluid source, and a high-pressure fluid from the fluid source is allowed to pass through the female coupling member only when the male coupling member has been completely connected to the female coupling member and then the female coupling member is fluid-communicated with the fluid source. Accordingly, the connecting operation can be performed with high safety, and the female coupling member is particularly suitable for handling high-pressure fluids such as gaseous hydrogen.

The female coupling member may be configured as follows. When the fluid source is communicated with the female coupling member after the male coupling member has been connected thereto, the valve member is displaced to the open position by the fluid pressure. At this time, the second locking member (50) displaced to the second position by the valve member prevents the pressing member (24) from returning to the standby position.

With this arrangement, if the pressing member (24) is pulled back toward the standby position in a state where the valve member is in the open position, the second locking member prevents the pressing member from returning to the standby position. Accordingly, there is no danger of the male coupling member being accidentally disconnected from the female coupling member while the fluid is being passed.

Specifically, the female coupling member may further include an urging member (26) urging the pressing member from the unlocking position toward the pressing position. The pressing member may be displaced to the pressing position as the holding member is displaced to the displacement allowing position (FIGS. 4 and 5) by the male coupling member inserted into the housing.

With this arrangement, when the male coupling member is inserted, the first locking member automatically engages with the inserted male coupling member to connect together the male and female coupling members.

More specifically, the valve member (30) may include a valving element (32) displaceable in the axial direction of the housing, and a movable valve seat element (34) provided in the housing adjacently to the valving element at a side thereof closer to the one end of the housing. The movable valve seat element is displaceable in the axial direction and urged toward the other end of the housing by a spring urging force so as to be displaced toward the other end together with the valving element and sealingly engaged with the valving element, thus placing the valve member in the closing position. The movable valve seat element is displaced toward the one end of the housing by the fluid pressure, thus being displaced relative to the valving element to cancel the sealing engagement between the movable valve seat element and the valving element to bring the valve member into the open position.

The female coupling member may also be configured as follows. The second locking member (50) is positioned adjacently to the movable valve seat element and displaced from the first position to the second position in response to the movable valve seat element being displaced toward the one end of the housing by the fluid pressure.

More specifically, the pressing member (24) may be a tubular member provided on the outer peripheral surface of the housing and displaceable between the standby position and a pressing position closer to the one end of the housing than the standby position.

The second locking member (50) may be provided between the pressing member placed in the standby position and the movable valve seat element in the radial direction of the housing.

The female coupling member may be configured such that the valving element (32) is stopped from being displaced in the course of being displaced toward the one end of the housing together with the movable valve seat element (34) by the fluid pressure and then the movable valve seat element is displaced relative to the stopped valving element to open the fluid passage.

Specifically, the valving element (32) may be stopped from being displaced in the course of being displaced toward the one end of the housing by engaging with the forward end of the male coupling member inserted into the female coupling member and engaged with the first locking member.

More specifically, the female coupling member may be configured to comprise an arresting member (42) provided between the one end of the housing and the valving element to extend in the axial direction of the housing. The valving element engages with the forward end of the male coupling member through the arresting member.

Even more specifically, the arresting member (42) may be displaceable in the axial direction and displaced toward the other end of the housing by being engaged with the forward end of the male coupling member inserted into the housing and engaged with the first locking member to a position a predetermined distance toward the one end of the housing from the valving element when the valve member is in the closing position.

In addition, the present invention provides a male coupling member connected to a female coupling member arranged as stated above by being inserted from the one end of the housing. The male coupling member displaces the holding member from the holding position to the displacement allowing position by being inserted from the one end of the housing.

In addition, the present invention provides a male coupling member connected to a female coupling member arranged as stated above by being inserted from the one end of the housing. The male coupling member displaces the holding member from the holding position to the displacement allowing position and engages with the arresting member by being inserted from the one end of the housing.

An embodiment of a pipe coupling suitable for handling a high-pressure fluid according to the present invention will be explained below with reference to the accompanying drawings.

BRIEF DESCRIPTION OF THE DRAWINGS

FIG. 1 is a longitudinal sectional view of a female coupling member of a pipe coupling according to the present invention, showing a state where high-pressure fluid is supplied from the left end side of the female coupling member, with a male coupling member not being connected to the female coupling member.

FIG. 2 is a longitudinal sectional view of the pipe coupling according to the present invention, showing a state where the male coupling member is being connected to the female coupling member of FIG. 1 when not being supplied with high-pressure fluid.

FIG. 3 is a longitudinal sectional view of the pipe coupling according to the present invention, showing a state where the male coupling member has been inserted into the female coupling member and a first locking member of the female coupling member has been engaged with the male coupling member.

FIG. 4 is a longitudinal sectional view of the pipe coupling according to the present invention, showing a state where a pressing member of the female coupling member is in the position for pressing the first locking member engaged with the male coupling member.

FIG. 5 is a longitudinal sectional view of the pipe coupling according to the present invention, showing a state where high-pressure fluid is supplied after the position shown in FIG. 4 has been reached.

DETAILED DESCRIPTION OF THE PREFERRED EMBODIMENTS

Best Mode for Carrying Out the Invention

As illustrated in the figures, a high-pressure fluid pipe coupling 10 according to the present invention comprises a female coupling member 12 and a male coupling member 14.

The female coupling member 12 has a tubular housing 16 having one end (right end in FIG. 1) for receiving the male coupling member 14 and the other end (left end) to be connected to a fluid source (not shown). The housing comprises a large number of parts 16-1 to 16-8 combined together by thread engagement or the like.

A collet chuck type first locking member 18 is provided near the right end of the housing. The first locking member 18 is supported pivotably between a locking position (FIG. 5) where the first locking member 18 engages with the male coupling member 14 inserted into the female coupling member 12 from the right end of the housing to connect the male coupling member 14 to the female coupling member 12 and an unlocking position (FIG. 2) for disconnecting the male coupling member 14 from the female coupling member 12.

The housing has a tubular holding member 20 radially inward of the first locking member 18. The holding member 20 is displaceable between a holding position (FIG. 2) where the holding member 20 holds the first locking member 18 in the unlocking position (FIG. 2) and a displacement allowing position (FIG. 5) where the holding member 20 is pushed in by the male coupling member 14 inserted into the housing to allow the first locking member 18 to be displaced to the locking position. The holding member is urged toward the holding position by a coil spring 22.

In addition, a tubular pressing member 24 is provided on the outer peripheral surface of the housing 16. The pressing member 24 comprises an inner tubular member 24-1 and an outer tubular member 24-2 and is displaceable between a standby position (FIG. 2) where the pressing member 24 allows the first locking member 18 to assume the unlocking position and a pressing position (FIGS. 4 and 5) where the pressing member 24 presses the first locking member in the locking position in response to the holding member 20 being displaced to the displacement allowing position. The pressing member 24 is urged toward the pressing position (FIG. 4) from the standby position (FIG. 2) by an urging member, i.e., a coil spring 26.

A valve member 30 is provided in the housing 16. The valve member 30 is displaceable between an open position (FIG. 5) where the valve member 30 opens a fluid passage in the housing and a closing position (FIGS. 2 to 4) where the valve member 30 closes the fluid passage.

Specifically, the valve member 30 comprises a valving element 32 displaceable in the axial direction of the housing and a movable valve seat element 34. The movable valve seat element 34 is urged leftward as viewed in the figures by an urging force-transmitting member 36 urged leftward by a coil spring 38. The movable valve seat element 34 is displaced leftward together with the valving element 32, and thus the valve member 30 is placed in the closing position (FIGS. 2 to 4). That is, although being urged rightward by a coil spring 40, the valving element 32 is displaced leftward by the coil spring 38, which has a larger spring force than the coil spring 40. In this state, the distal end portion of the outer peripheral surface of the valving element 32 sealingly engages with the inner peripheral surface of the movable valve seat element 34 to close the fluid passage.

After the male coupling member 14 has been inserted into the female coupling member 12 and the valve member 30 has been brought into the position shown in FIG. 4, a valve (not shown) for opening and closing the fluid source is opened to supply a high fluid pressure into the fluid passage in the housing 16. Consequently, the valving element 32 and the movable valve seat element 34 are displaced rightward, and the valve member is brought into the open position (FIG. 5) as described below.

An elongate tubular arresting member 42 is provided in a bore formed in the housing 16 along the center axis thereof. The arresting member 42 extends in the axial direction of the housing between the right end of the housing and the valving element 32. The arresting member 42 is displaceable in the axial direction of the housing. The arresting member 42 is engaged with the forward end of the male coupling member 14 that is inserted into the housing and engaged with the first locking member 18, and thus the arresting member 42 is displaced leftward to a position a predetermined distance from the valving element 32 when the valve member is in the closing position (FIG. 4). When, in this state, the high-pressure fluid from the fluid source is introduced into the housing, the valving element 32 and the movable valve seat element 34 are displaced rightward together. In this process, the valving element 32 is arrested by the arresting member 42, but the movable valve seat element 34 continues to be displaced rightward even after the stoppage of the valving element 32 and is stopped a while later. Thus, the sealing engagement between the distal end portion of the outer peripheral surface of the valving element and the inner peripheral surface of the movable valve seat element is canceled to open the fluid passage (FIG. 5). It should be noted that the arresting member is formed by connecting two members from the manufacturing point of view and urged rightward by a coil spring 46.

A particularly important feature of the pipe coupling according to the present invention resides in a second locking member 50.

The second locking member 50 is provided between the valve member 30 and the pressing member 24. When the housing is communicated with the fluid source with the pressing member 24 placed in the standby position (FIG. 2), the second locking member 50 is pushed radially outward by the valve member 30 (specifically, by the movable valve seat element 34 thereof) displaced toward the open position (FIG. 5) by the fluid pressure. However, as shown in FIG. 1, the second locking member 50 engages with the pressing member 24 before the valve member 30 reaches the open position (FIG. 5), thereby preventing the valve member 30 from reaching the open position. At the same time, the second locking member 50 engages in a recess 24-3 provided in the pressing member 24, thereby preventing the pressing member 24 from being displaced to the pressing position. Thus, the male coupling member is surely prevented from being connected in a state where the fluid source is communicated with the housing.

On the other hand, when the housing is communicated with the fluid source with the pressing member 24 placed in the pressing position (FIG. 4), the second locking member 50 does not engage with the pressing member 24 and allows the valve member 30 to be displaced to the open position. That is, the high-pressure fluid can pass through the valve when the fluid source is communicated with the housing under the condition that the male coupling member has already been connected to the female coupling member and the pressing member 24 has been brought into the pressing position.

The second locking member 50 displaced by the valve member moved to the open position by the fluid pressure will prevent the pressing member 24 from returning to the standby position.

The forward end portion of the male coupling member 14 is configured as follows. As the forward end portion of the male coupling member 14 is inserted into the housing of the female coupling member 12, the holding member 20 of the female coupling member 12 is pushed inward of the housing to reach the displacement allowing position (FIG. 3), and at the same time, the arresting member 42 is pushed inward of the housing. In addition, the outer peripheral surface of the male coupling member 14 is provided with an annular recess 54 in which the first locking member is engaged.

Although one embodiment of the pipe coupling according to the present invention has been described above, the present invention is not limited to the described embodiment but can be modified in a variety of ways without departing from the scope of the invention set forth in the appended claims.

What is claimed is:

1. A female coupling member comprising:
    a tubular housing having one end for receiving a male coupling member and an other end to be communicated with a fluid source;
    a first locking member attached to the housing and displaceable between a locking position where the first locking member engages with the male coupling member inserted from the one end of the housing to connect the male coupling member to the housing and an unlocking position where the first locking member disengages from the male coupling member to disconnect the male coupling member from the housing;
    a holding member displaceable between a holding position where the holding member holds the first locking member in the unlocking position and a displacement allowing position where the holding member is displaced by the male coupling member inserted into the housing to allow the first locking member to be displaced to the locking position;
    a pressing member attached to the housing and displaceable between a standby position where the pressing member allows the first locking member to assume the unlocking position and a pressing position where the pressing member presses the locking member in the locking position in response to the holding member being displaced to the displacement allowing position;
    a valve member displaceable between an open position where the valve member opens a fluid passage in the housing that is communicated with the male coupling member inserted into the housing and a closing position where the valve member closes the fluid passage, the valve member being displaced to the open position by a pressure in the fluid passage in the housing; and
    a second locking member provided between the valve member and pressing member and displaceable between a first position and a second position, wherein, when the housing is communicated with the fluid source with the pressing member placed in the standby position, the second locking member is displaced from the first position toward the second position by the valve member displaced toward the open position by fluid pressure but prevented from reaching the second position by engaging with the pressing member before the valve member reaches the open position, thereby preventing the valve member from reaching the open position and also preventing the pressing member from being displaced to the pressing position, and when the housing is communicated with the fluid source with the pressing member placed in the pressing position, the second locking member is displaced from the first position to the second position without engaging with the pressing member, thereby allowing the valve member to be displaced to the open position.

2. The female coupling member of claim 1, wherein, when displaced to the second position, the second locking member prevents the pressing member from returning to the standby position.

3. The female coupling member of claim 1, further comprising:
    an urging member urging the pressing member from the unlocking position toward the pressing position, the pressing member being displaced to the pressing position as the holding member is displaced to the displacement allowing position by the male coupling member inserted into the housing.

4. The female coupling member of claim 1, wherein the valve member comprises:
    a valving element displaceable in an axial direction of the housing; and
    a movable valve seat element provided in the housing adjacently to the valving element at a side thereof closer to the one end of the housing, the movable valve seat element being displaceable in the axial direction and urged toward the other end of the housing by a spring urging force so as to be displaced toward the other end together with the valving element and sealingly engaged with the valving element, thus placing the valve member in the closing position, the movable valve seat element being displaced toward the one end of the housing by the fluid pressure, thus being displaced relative to the valving element to cancel sealing engagement between the movable valve seat element and valving element to bring the valve member into the open position.

5. The female coupling member of claim 4, wherein the second locking member is positioned adjacently to the movable valve seat element and displaced from the first position to the second position in response to the movable valve seat element being displaced toward the one end of the housing by the fluid pressure.

6. The female coupling member of claim 5, wherein the pressing member is a tubular member provided on an outer peripheral surface of the housing and displaceable between the standby position and the pressing position closer to the one end of the housing than the standby position;
    the second locking member being provided between the pressing member placed in the standby position and the movable valve seat element in a radial direction of the housing.

7. The female coupling member of claim 4, wherein the valving element is stopped from being displaced in a course of being displaced toward the one end of the housing together with the movable valve seat element by the fluid pressure, the movable valve seat element being displaced relative to the valving element stopped to open the fluid passage.

8. The female coupling member of claim 7, wherein the valving element is stopped from being displaced in the course of being displaced toward the one end of the housing by engaging with a forward end of the male coupling member engaged with the first locking member.

9. The female coupling member of claim 8, wherein an arresting member is provided between the one end of the housing and the valving element to extend in the axial direction of the housing, the valving element engaging with the forward end of the male coupling member through the arresting member.

10. The female coupling member of claim 9, wherein the arresting member is displaceable in the axial direction and displaced toward the other end of the housing by being engaged with the forward end of the male coupling member that is inserted into the housing and engaged with the first locking member to a position a predetermined distance toward the one end of the housing from the valving element when the valve member is in the closing position.

11. A male coupling member connected to the female coupling member of claim 9 by being inserted from the one end of the housing, the male coupling member displacing the holding member from the holding position to the displacement allowing position and engaging with the arresting member by being inserted from the one end of the housing.

12. A male coupling member connected to the female coupling member of claim 1 by being inserted from the one end of the housing, the male coupling member displacing the holding member from the holding position to the displacement allowing position by being inserted from the one end of the housing.

* * * * *

UNITED STATES PATENT AND TRADEMARK OFFICE
CERTIFICATE OF CORRECTION

| | |
|---|---|
| PATENT NO. | : 8,186,649 B2 |
| APPLICATION NO. | : 12/914227 |
| DATED | : May 29, 2012 |
| INVENTOR(S) | : Kazunori Aoki |

It is certified that error appears in the above-identified patent and that said Letters Patent is hereby corrected as shown below:

In the Claims

Column 10, claim 12, line 11, before "by being inserted from" insert --and engaging with the arresting member--.

Signed and Sealed this
Seventh Day of August, 2012

David J. Kappos
*Director of the United States Patent and Trademark Office*